(12) United States Patent
Park et al.

(10) Patent No.: US 10,038,914 B2
(45) Date of Patent: Jul. 31, 2018

(54) METHOD AND APPARATUS FOR PROCESSING VIDEO SIGNAL

(71) Applicant: LG ELECTRONICS INC., Seoul (KR)

(72) Inventors: Joonyoung Park, Seoul (KR); Seungwook Park, Seoul (KR); Jaehyun Lim, Seoul (KR); Jungsun Kim, Seoul (KR); Younghee Choi, Seoul (KR); Jaewon Sung, Seoul (KR); Byeongmoon Jeon, Seoul (KR); Yongjoon Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/685,662

(22) Filed: Aug. 24, 2017

(65) Prior Publication Data

US 2017/0353734 A1    Dec. 7, 2017

Related U.S. Application Data

(63) Continuation of application No. 15/280,755, filed on Sep. 29, 2016, now Pat. No. 9,800,892, which is a
(Continued)

(51) Int. Cl.
*H04N 19/55* (2014.01)
*H04N 19/52* (2014.01)
(Continued)

(52) U.S. Cl.
CPC .......... *H04N 19/55* (2014.11); *H04N 19/172* (2014.11); *H04N 19/176* (2014.11);
(Continued)

(58) Field of Classification Search
CPC ..................................................... H04N 19/55
(Continued)

(56) References Cited

U.S. PATENT DOCUMENTS

2004/0008784 A1   1/2004  Kikuchi et al.
2007/0211802 A1*  9/2007  Kikuchi .............. H04N 19/573
                                                 375/240.16
(Continued)

FOREIGN PATENT DOCUMENTS

KR       20040002582 A       1/2004
KR       20040031556 A       4/2004
(Continued)

OTHER PUBLICATIONS

International Search Report PCT/ISA/210 for International Application No. PCT/KR2011/002497 dated Nov. 30, 2011.
(Continued)

*Primary Examiner* — Yulin Sun
(74) *Attorney, Agent, or Firm* — Dentons US LLP

(57) ABSTRACT

The present invention relates to a method and apparatus for processing a video signal, which can increase the accuracy of the motion vector prediction through motion vector scaling which takes a difference in the temporal distance between reference pictures into consideration. To this end, the present invention provides a video signal processing method and a video signal processing apparatus using the same, and the method comprises the steps of: scaling at least one neighboring partition motion vector for a motion vector prediction of the current partition; scaling the neighboring partition motion vector, which has been selected, when the reference picture of the neighboring partition motion vector is different from the reference picture of the current partition; acquiring a motion vector prediction value of the current partition using the scaled motion vector; and acquir-
(Continued)

ing a motion vector of the current partition using the motion vector prediction value.

20 Claims, 15 Drawing Sheets

Related U.S. Application Data continuation of application No. 15/136,517, filed on Apr. 22, 2016, now Pat. No. 9,699,473, which is a continuation of application No. 14/987,280, filed on Jan. 4, 2016, now Pat. No. 9,407,929, which is a continuation of application No. 14/564,825, filed on Dec. 9, 2014, now Pat. No. 9,264,734, which is a continuation of application No. 13/639,408, filed as application No. PCT/KR2011/002497 on Apr. 8, 2011, now Pat. No. 8,976,865.

(51) Int. Cl.
| | |
|---|---|
| *H04N 19/61* | (2014.01) |
| *H04N 19/176* | (2014.01) |
| *H04N 19/593* | (2014.01) |
| *H04N 19/625* | (2014.01) |
| *H04N 19/172* | (2014.01) |
| *H04N 19/184* | (2014.01) |
| *H04N 19/513* | (2014.01) |

(52) U.S. Cl.
CPC ......... *H04N 19/184* (2014.11); *H04N 19/513* (2014.11); *H04N 19/52* (2014.11); *H04N 19/593* (2014.11); *H04N 19/61* (2014.11); *H04N 19/625* (2014.11)

(58) Field of Classification Search
USPC ..................................................... 375/240.16
See application file for complete search history.

(56) References Cited

U.S. PATENT DOCUMENTS

| | | | |
|---|---|---|---|
| 2008/0063075 | A1 | 3/2008 | Kondo et al. |
| 2009/0002379 | A1* | 1/2009 | Baeza ........................ G06T 1/20 345/522 |
| 2009/0074069 | A1 | 3/2009 | Jeon |
| 2009/0304068 | A1 | 12/2009 | Pandit et al. |
| 2009/0304084 | A1* | 12/2009 | Hallapuro ............. H04N 19/52 375/240.16 |

FOREIGN PATENT DOCUMENTS

| | | |
|---|---|---|
| KR | 10-2007-0011044 A | 1/2007 |
| KR | 20080085812 A | 9/2008 |
| WO | 2009/051419 A2 | 4/2009 |

OTHER PUBLICATIONS

Jingjing Da et al: "An efficient motion vector coding algorithm based on adaptive motion vector prediction", 90. MPEG Meeting; Oct. 26, 2009-Oct. 30, 2009; Xian; (Motion Picture Expert Group or ISO/IEC JTC1/SC29/VVG11), No. M16862, Oct. 23, 2009 (Oct. 23, 2009), XP030045452, "abstract" "section II.B".
Tourapis A M et al: "Motion Vector Prediction With Reference Frame Consideration", Proceedings of SPIE, SPIE-Internation Society for Optical Engineering, US, vol. 5203, Jan. 1, 2003 (Jan. 1, 2003), p. 440-447, XP002550052, ISSN: 0277-786X, D01:10.1117/12.5078.
Davies (BBC) T: "Video coding technology proposal by BB(and Samsung)" 1. JCT-VC Meeting; Apr. 15, 2010-Apr. 23, 2010; dresden; (Jointcollaborative Team on Video Coding of ISO/IEC JTC1/SC29/VVG11 and ITU-TSG.16); URL: http://vvftp3. itu.int/av-arch/actvc-site/. No. XP030007574, Apr. 16, 2010 (Apr. 16, 2010), XP030007575, ISSN:0000-0049 section 2.3.1.
McCann (Zetacast /Samsung) K et al: "Video coding technology proposal by Samsung (and BBC)", 1. JCT-VC Meetinf; Apr. 15, 2010-Apr. 23, 2010; Dresden; (Jointcollaboratvie Team on Video Docing of ISO/IEC JTC1/SC29/WG11 and ITU-TSG.16); URL: http://vvftp3.itu.int/av-arch/jctvc-site/, No. XP030007572, Jun. 1, 2010 (Jun. 1, 2010), XP030007573, ISSN:0000-0049 section 2.3.2.
Laroche G et al: "RD Optimized Coding for 1-12 Motion Vector Predictio Selection", IEEE Transactions on Circuits and Systems for Video Technology, IEEE Service Center, Piscataway. NJ, US, vol. 18, No. 9, Sep. 1, 2008-(Sep. 1, 2008), pp. 1247-1257, XP011231739, ISSN: 1051-8251, DOI, 10.1109/TCSVT.2008. 928882 abstract* sections II. B and III*.
Joonyoung Par et al: "Improvements on median motion vector of AMVP", 4. JCT-VC Meetins; 95. MPEG Meeting; Jan. 20, 2011-Jan. 28, 2011; Daegr;(Joint Collaborative Team on Video Coding of ISO/ICE JTC1/SC29NVG11AND ITU-T SG.16); URL http://vvftp3.itu.int/av-arch/jctvc-site/, No. JCTVC-D095, Jan. 14, 2011 (Jan. 14, 2011), XP030008135, ISSN:000-0015 'abstract' 'section 1-2' 'figure'.
J-L Lin et al: "Improved Advanced Motion Vector Prediction", 4. JCT-VC Meeting; 95. MPEG Meetin; Jan. 20, 2011-Jan. 28, 2011L Daegu;(Joing Collaborative Team on Video Coding of ISO.IEC JTC1/SC29NVG11AND ITU-T SG.16); URL: httpinvftp3.itu.int/av-arch/jctvc-site/,No. JCTVC-D125, Jan. 15, 2011 (Jan. 15, 2011), XP030008165, ISSSN : 0000-0015 "abstract" sections 1-2* 'figures 1-4'.
Office Action for corresponding European Application No. 11 766 196.7 dated Sep. 5, 2014.

\* cited by examiner

| MV_d refidx_d | MV_b refidx_b | MV_c refidx_c |
|---|---|---|
| MV_a refidx_a | MVp refidx | |

FIG. 10

| | B<br>predFlagL0 : 0<br>refIdxL0 : -1<br>predFlagL1 : 1<br>refIdxL1 : 1 | C<br>predFlagL0 : 1<br>refIdxL0 : 0<br>predFlagL1 : 1<br>refIdxL1 : 0 |
|---|---|---|
| A<br>predFlagL0 : 1<br>refIdxL0 : 0<br>predFlagL1 : 0<br>refIdxL1 : -1 | Cur<br>predFlagL0 : 1<br>refIdxL0 : 0<br>predFlagL1 : 0<br>refIdxL1 : -1 | |

POC of ref_idx0 of List0: 4
POC of ref_idx1 of List0: 2
POC of ref_idx0 of List1: 2
POC of ref_idx1 of List1: 4

FIG. 11

| | B<br>predFlagL0 : 0<br>refIdxL0 : -1<br>predFlagL1 : 0<br>refIdxL1 : -1 | C<br>predFlagL0 : 0<br>refIdxL0 : -1<br>predFlagL1 : 0<br>refIdxL1 : -1 |
|---|---|---|
| A<br>predFlagL0 : 0<br>refIdxL0 : -1<br>predFlagL1 : 1<br>refIdxL1 : 1 | Cur<br>predFlagL0 : 1<br>refIdxL0 : 0<br>predFlagL1 : 0<br>refIdxL1 : -1 | |

POC of ref_idx0 of List0: 4
POC of ref_idx1 of List0: 2
POC of ref_idx0 of List1: 2
POC of ref_idx1 of List1: 4

METHOD AND APPARATUS FOR PROCESSING VIDEO SIGNAL

This application is a continuation of U.S. patent application Ser. No. 15/280,755 filed on Sep. 29, 2017, which is a continuation of Ser. No. 15/136,571, filed on Apr. 22, 2016, now U.S. Pat. No. 9,699,473, which is a continuation of Ser. No. 14/987,280 filed on Jan. 4, 2016, now U.S. Pat. No. 9,407,929, which is a continuation of U.S. patent application Ser. No. 14/564,825 filed on Dec. 9, 2014, now U.S. Pat. No. 9,264,734, which is a continuation of U.S. patent application Ser. No. 13/639,408, filed on Oct. 4, 2012, now U.S. Pat. No. 8,976,865, which is a National Stage Application of International Application No. PCT/KR2011/002497, filed on Apr. 8, 2011, which claims benefit of Korean Patent Application No. 10-2011-0032376, filed on Apr. 7, 2011, and which claims the benefit of U.S. Provisional Application No. 61/322,301, filed on Apr. 9, 2010; 61/373,286, filed on Aug. 13, 2010; 61/424,681, filed on Dec. 20, 2010; 61/432,202, filed on Jan. 13, 2011; 61/454,995, filed on Mar. 21, 2011 and 61/466,446, filed on Mar. 22, 2011, which are hereby incorporated by reference as if fully set forth herein.

TECHNICAL FIELD

The present invention relates to a method and apparatus for processing a video signal and, more particularly, to a method and apparatus for encoding or decoding a video signal.

BACKGROUND ART

Compression coding is a signal processing technique of transmitting digital information through a communication line or storing the digital information in a form suitable for a storage medium. Audio, video and text information may be a target of compression coding and, particularly, compression coding performed on the video information is referred to as video compression. Video signal compression is performed by eliminating redundant information in consideration of spatial correlation, temporal correlation, stochastic correlation, etc. With the development of a variety of media and data transmission media, however, there is a need for a high efficiency video signal processing method and apparatus.

DISCLOSURE

Technical Problem

To improve video compression efficiency, a method of predicting a motion vector of the current partition using a motion vector of a neighboring partition may be used. In this case, the motion vector of the neighboring partition is used for prediction of the motion vector of the current partition regardless of a difference between reference pictures of the current partition and the neighboring partition. This decreases the accuracy of motion vector prediction.

Furthermore, since a neighboring motion vector candidate group is limited to neighboring partitions having the same reference picture list and the same reference picture as those of the current partition, the probability that an available neighboring motion vector can be acquired decreases.

In addition, complexity of a process of selecting a neighboring motion vector to be used for motion vector prediction increases as the number of candidates increase, and thus a method for efficiently perform the selection process is needed.

Technical Solution

To solve the above-described problems, an object of the present invention is to increase the accuracy of motion vector prediction through motion vector scaling which takes a temporal distance difference between reference pictures into consideration.

Another object of the present invention is to detect a neighboring motion vector which refers to the same reference picture from different reference picture lists and to use the detected neighboring motion vector for motion vector prediction.

Another object of the present invention is to extend a neighboring motion vector candidate group for motion vector prediction.

Another object of the present invention is to provide efficient priority search conditions for a process of selecting a neighboring partition motion vector to be included in a motion vector prediction candidate group of the current partition.

Another object of the present invention is to unify motion information prediction methods in all modes by applying a method of acquiring motion information of a neighboring partition, used in a merge mode, to a normal inter mode.

Advantageous Effects

According to a video signal processing apparatus of the present invention, it is possible to increase the accuracy of motion vector prediction by scaling a motion vector of a neighboring partition in consideration of a temporal distance difference between reference pictures and using the scaled neighboring partition motion vector for prediction of a motion vector of the current partition.

Furthermore, since neighboring motion vectors of various candidate groups are used in addition to neighboring motion vectors which refer to the same reference picture in the same reference picture list, it is possible to increase flexibility of motion vector prediction and to extend the range of selection of a neighboring motion vector for accurate motion vector prediction.

In addition, a neighboring partition motion vector for motion vector prediction of the current partition is searched for by appropriately combining motion vector prediction candidate group selection conditions and partition position order counts, and thus search operation complexity can be reduced and an available neighboring motion vector can be acquired.

Moreover, it is possible to decrease the complexity of acquisition of neighboring partition motion information by unifying neighboring partition motion information acquisition methods in a merge mode, a skip mode and an inter mode.

DESCRIPTION OF DRAWINGS

FIGS. 10 and 11 show exemplary reference picture lists and reference index values of the current partition and spatial neighboring partitions;

BEST MODE FOR CARRYING OUT THE INVENTION

Figure 1:
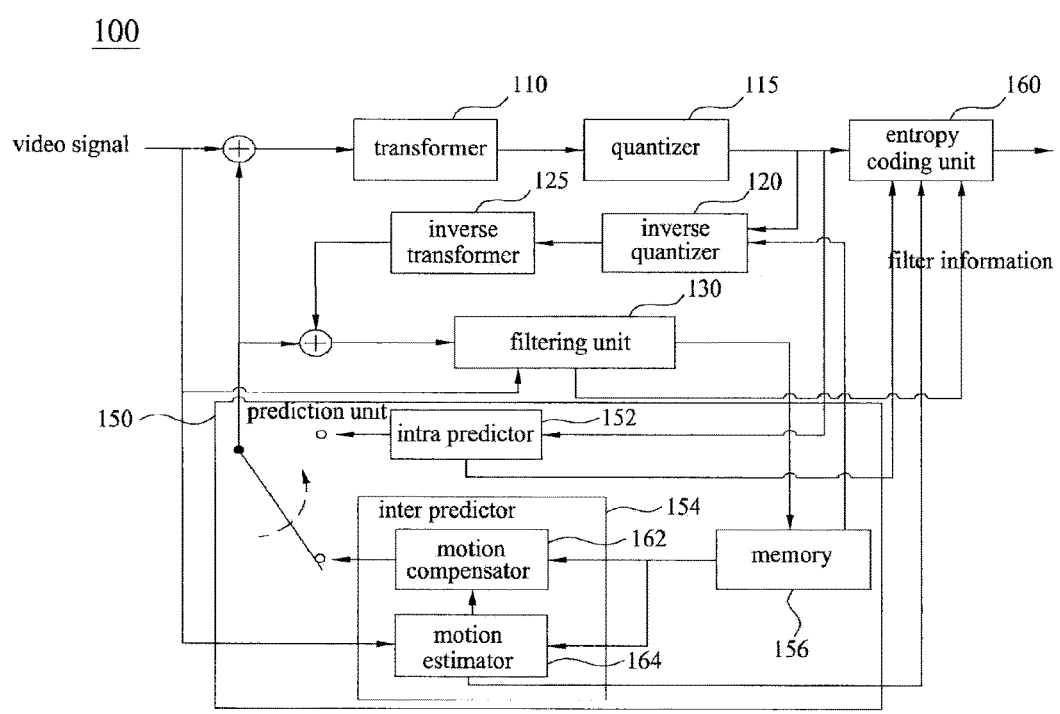
FIG. 1 is a block diagram of a video signal encoder according to an embodiment of the present invention.

According to one aspect of the present invention, a video signal processing method includes: selecting at least one neighboring partition motion vector for motion vector prediction of the current partition; scaling the selected neighboring partition motion vector when a reference picture of the neighboring partition motion vector is different from a reference picture of the current partition; acquiring a motion vector prediction value of the current partition using the scaled motion vector; and acquiring a motion vector of the current partition using the motion vector prediction value.

The scaled motion vector may be a motion vector linearly interpolated using a temporal distance between pictures.

The motion vector prediction candidate group may include motion vectors respectively selected from a first group including a bottom left neighboring partition $A_{m|1}$ of the current partition and the lowest partition $A_m$ among left neighboring partitions of the current partition, and a second group including a top right neighboring partition $B_{n+1}$ of the current partition, the rightmost partition $B_n$ among top neighboring partitions of the current partition, and a top left neighboring partition $B_{-1}$ of the current partition.

The selecting the neighboring partition motion vector may include respectively selecting motion vectors from the first group and the second group on the basis of motion vector prediction candidate group selection conditions with regard to a reference picture list, a reference picture and information indicating an inter mode.

The motion vector prediction candidate group selection conditions sequentially determine; (a) whether a neighboring partition is an inter mode partition having the same reference picture list and the same reference picture as those of the current partition, (b) whether a neighboring partition is an inter mode partition having a reference picture list different from that of the current partition and the same reference picture as that of the current partition, (c) whether a neighboring partition is an inter mode partition having the same reference picture list as that of the current partition and a reference picture different from that of the current partition, and (d) whether a neighboring partition is an inter mode partition.

Whether the neighboring partition is an inter mode partition having a reference picture list different from that of the current partition and the same reference picture as that of the current partition may be determined on the basis of a picture order count (POC) value.

The selecting the neighboring partition motion vector may include performing condition first search, which prioritizes the motion vector prediction candidate group selection conditions higher than partition position order, on the partitions of the first or second group.

The selecting the neighboring partition motion vector may include performing partition position first search, which prioritizes partition position order higher than the motion vector prediction candidate group selection conditions, on the partitions of the first or second group.

The selecting the neighboring partition motion vector may include: performing condition first search on the partitions of the first or second group for the motion vector prediction candidate group selection condition (a); and performing partition position first search for the motion vector prediction candidate group selection conditions (b), c) and (d) if an available neighboring partition motion vector is not searched through the condition first search.

According to another aspect of the present invention, a video signal processing apparatus includes: a neighboring partition motion vector selector for selecting a neighboring partition motion vector to be included in a motion vector prediction candidate group of the current partition; a motion vector scaler for scaling the selected neighboring partition motion vector when a reference picture of the neighboring partition is different from a reference picture of the current partition; a motion vector prediction value acquisition unit for acquiring a motion vector prediction value of the current partition using the motion vector prediction candidate group including the scaled motion vector; and a motion vector acquisition unit for acquiring a motion vector of the current partition using the motion vector prediction value.

MODE FOR INVENTION

Exemplary embodiments of the present invention will be described below with reference to the attached drawings. Prior to describing the present invention, it is to be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

In the specification, the following terms and even terms that are not described may be interpreted based on the following standard. 'Coding' may be interpreted as 'encoding' or 'decoding', and 'information' may include values, parameters, coefficients, elements, etc. and may be differently interpreted according to circumstance. However, the present invention is not limited thereto. 'Unit' is used to designate a basic image processing unit or a specific position in an image and may used be interchangeably with the term 'block', 'partition' or 'region'. In addition, in the specification, 'unit' may signify 'coding unit', 'prediction unit', 'transform unit'.

FIG. 1 is a block diagram of a video signal encoder 100 according to an embodiment of the present invention. Referring to FIG. 1, the video signal encoder 100 includes a transformer 110, a quantizer 115, an inverse quantizer 120, an inverse transformer 125, a filtering unit 130, a prediction unit 150, and an entropy coding unit 160.

The transformer 110 may convert pixel values of a video signal input thereto to acquire transform coefficients. For example, the transformer 110 can use discrete cosine transform (DCT) or wavelet transform. DCT segments the input video signal into blocks having a predetermined size and transforms the blocks. Coding efficiency may depend on a distribution and characteristics of values in a transform area.

The quantizer 115 quantizes the transform coefficients output from the transformer 110. The inverse quantizer 120 inversely quantizes the transform coefficients and the inverse transformer 125 restores pixel values using the inversely quantized transform coefficients.

The filtering unit 130 performs filtering to improve the quality of a restored image. For example, the filtering unit 130 can include a deblocking filter and an adaptive loop filter. The filtered image is output or stored in a memory 156 to be used as a reference picture.

To improve coding efficiency, a method of predicting an image using a previously coded region and adding a residual value between the predicted image and an original image to the predicted image to acquire a restored image is used instead of a method of directly coding a video signal. An intra predictor 152 performs intra prediction of the current image and an inter predictor 154 predicts the current image using a reference picture stored in the memory 156. The intra predictor 152 performs intra prediction from restored regions in the current image and transmits intra coding information to the entropy coding unit 160. The inter predictor 154 may include a motion compensator 162 and a motion estimator 164. The motion estimator 164 acquires a motion vector of the current region with reference to a restored region. The motion estimator 164 transmits position information (a reference picture, motion vector, etc.) on a reference region to the entropy coding unit 160 such that the position information can be included in a bitstream. The motion compensator 162 performs inter motion compensation using the motion vector value transmitted from the motion estimator 164.

The entropy coding unit 160 entropy-codes the quantized transform coefficients, inter coding information, the intra coding information, and reference region information input from the inter predictor 154 to generate a video signal bitstream. The entropy coding unit 160 may use variable length coding (VLC) and arithmetic coding. VLC converts input symbols into consecutive codewords. Here, the codewords may have a variable length. For example, frequently generated symbols are represented as short codewords whereas symbols that are not frequently generated are represented as long codewords. Context-based adaptive variable length coding (CAVLC) may be used as a VLC scheme. Arithmetic coding converts consecutive symbols into one prime number. It is possible to obtain an optimized prime number of bits necessary to represent each symbol according to arithmetic coding. Context-based adaptive binary arithmetic coding (CABAC) may be used as an arithmetic coding scheme.

Figure 2:
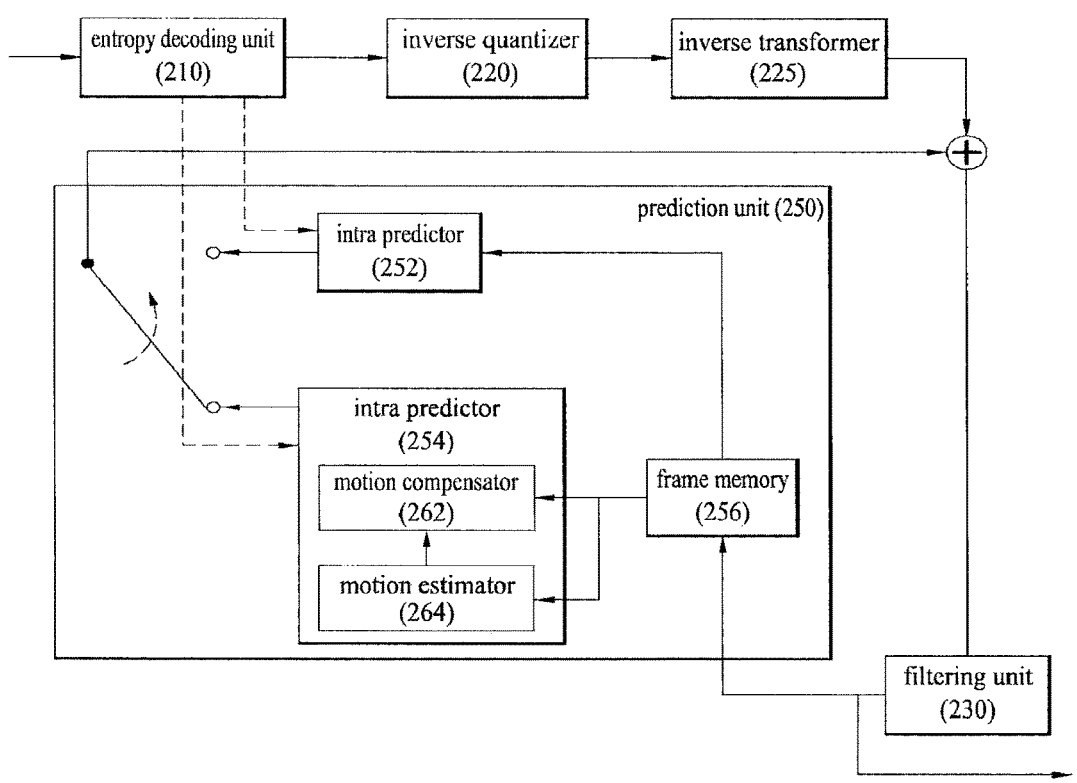
FIG. 2 is a block diagram of a video signal decoder according to an embodiment of the present invention.

FIG. 2 is a block diagram of a video signal decoder 200 according to an embodiment of the present invention. Referring to FIG. 2, the video signal decoder 200 includes an entropy decoding unit 210, an inverse quantizer 220, an inverse transformer 225, a filtering unit 230, and a prediction unit 250.

The entropy decoding unit 210 decodes a video signal bitstream input thereto to extract a transform coefficient and a motion vector with respect to each region. The inverse quantizer 220 inversely quantizes the entropy-decoded transform coefficient and the inverse transformer 225 restores a pixel value using the inversely quantized transform coefficient.

The filtering unit 230 filters an image to improve image quality. The filtering unit 230 may include a deblocking filter for reducing block distortion and/or an adaptive loop filter for eliminating image distortion. The filtered image is output or stored in a frame memory 256 to be used as a reference image.

The prediction unit 250 includes an intra predictor 252 and an inter predictor 254 and restores a prediction image using information such as coding type, the transform coefficient and motion vector with respect to each region, decoded by the entropy decoding unit 210.

To this end, the intra predictor 252 performs intra prediction from decoded samples in the current image.

The inter predictor 254 estimates a motion vector using a reference image stored in the frame memory 256 and generates the prediction image. The inter predictor 254 includes a motion compensator 262 and a motion estimator 264. The motion estimator 264 acquires a motion vector which represents the relationship between the current block and a reference block of a reference frame and delivers the motion vector to the motion compensator 262.

A prediction value output from the intra predictor 252 or the inter predictor 254 and the pixel value output from the inverse transformer 225 are summed to generate a restored video frame.

A description will be given of a method of segmenting a coding unit and a prediction unit in operations of the video signal encoder and video signal decoder with reference to FIGS. 3 to 5.

The coding unit is a basic unit for processing an image in the aforementioned video signal processing operation (e.g., in intra/inter prediction, transform, quantization and/or entropy coding). The size of the coding unit used to code an image need not be fixed. The coding unit may have a rectangular form and one coding unit may be segmented into multiple coding units.

Figure 3:
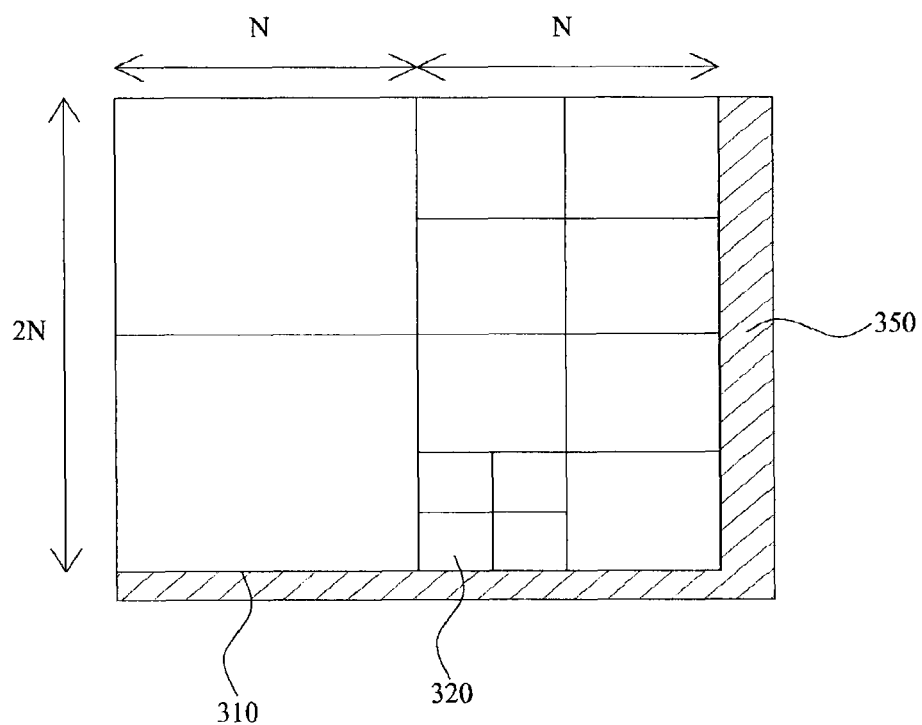
FIG. 3 illustrates an example of segmenting a unit according to an embodiment of the present invention.
Figure 4:
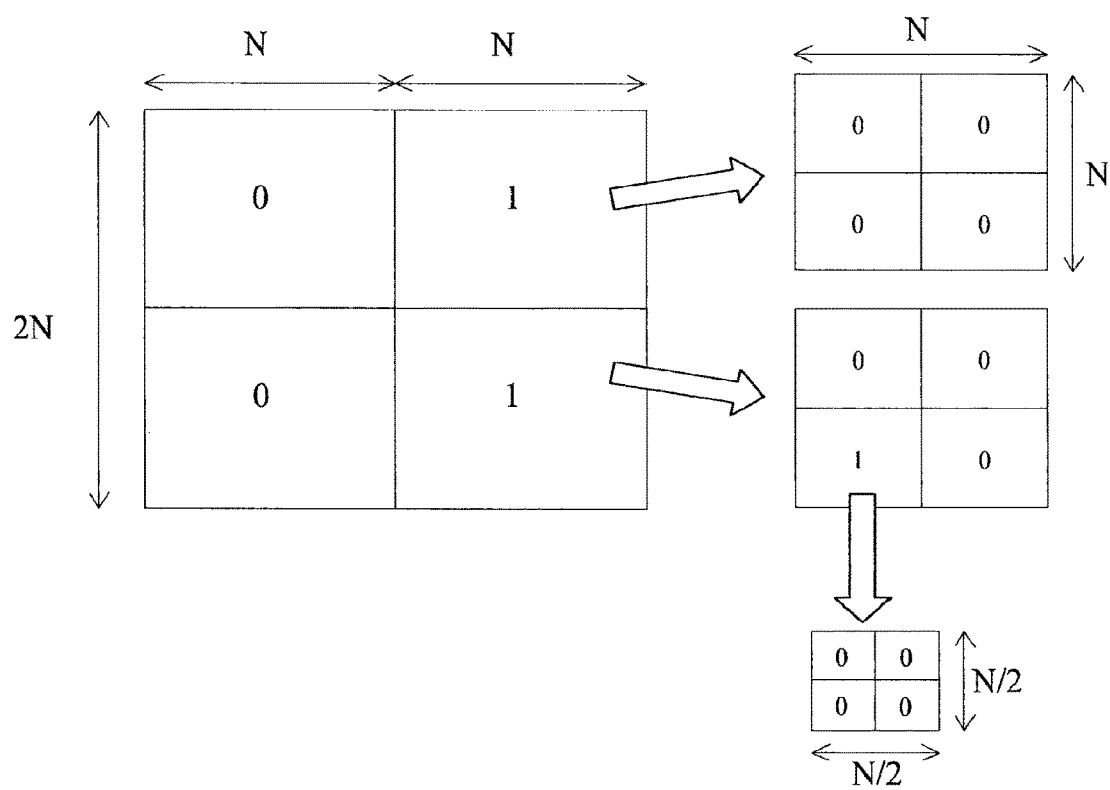
FIG. 4 illustrates a method of representing the segmentation structure of FIG. 3 in a hierarchical manner according to an embodiment of the present invention.

FIG. 3 illustrates an example of segmenting a coding unit according to an embodiment of the present invention. For example, a coding unit having a size of 2N×2N can be segmented into four N×N coding units. Coding unit segmentation may be performed recursively. It is not necessary to segment all coding units into units having the same form. However, a maximum size 310 or a minimum size 320 of a coding unit may be limited for facilitation of coding and processing operations.

Information representing whether a coding unit is segmented may be stored for the coding unit. For example, it is assumed that one coding unit can be segmented into four square coding units, as shown in FIG. 3. FIG. 4 illustrates a method of representing the coding unit segmentation structure of FIG. 3 in a hierarchical manner using 0 and 1 according to an embodiment of the present invention. The information representing whether the coding unit is segmented may be set to '1' when the coding unit is segmented and set to '0' when the coding unit is not segmented. As shown in FIG. 4, when a flag value indicating whether the coding unit is segmented is '1' a block corresponding to the node is divided into four blocks. When the flag value is '0', the corresponding coding unit can be processed without segmenting a block corresponding to the node.

It is not necessary for a block to be segmented into four square blocks. A code corresponding to a predetermined segmentation method may be mapped to segmentation information. For example, a corresponding block can be divided into two horizontal rectangular sub-blocks when a segmentation information value is 1, the block can be segmented into two vertical rectangular sub-blocks when the information value is 2, and the block can be segmented into four square sub-blocks when the information value is 3. This method is exemplary and does not limit the present invention.

The aforementioned coding unit structure may be represented using a recursive tree structure. Specifically, one picture or a coding unit having a maximum size becomes a root and a coding unit segmented into sub coding units has as many child nodes as the number of the sub coding units. A coding unit which is not segmented any more becomes a leaf node. If a coding unit can be segmented into only square units, the coding unit can be divided into a maximum of four sub coding units, and thus a tree representing the coding unit can be a quad tree.

The encoder selects an optimum coding unit size according to characteristics (e.g. resolution) of a video or in consideration of coding efficiency, and information about the optimum coding unit size or information from which the optimum coding unit size can be derived can be included in a bitstream. For example, a maximum coding unit size and a maximum depth of a tree can be defined. In the case of square segmentation, since the height and width of a coding unit correspond to half the height and width of a parent node, a minimum coding unit size can be acquired using the above-mentioned information. Conversely, a minimum coding unit size and a maximum depth of a tree can be predefined, and the maximum coding size can be derived using the minimum coding unit size and the maximum depth as necessary. Since the coding unit size is a multiple of 2 in the case of square segmentation, the actual coding unit size can be represented as a log value having 2 as the base so as to improve transmission efficiency.

The decoder can acquire information representing whether the current coding unit is segmented. If this information is acquired (transmitted) only under a specific condition, efficiency can be improved. For example, the current coding unit can be segmented when the current coding unit at a specific position within a picture is included in the picture and the size of the current coding unit is larger than a predetermined minimum coding unit, and thus it is possible to acquire the information representing whether the current coding unit is segmented only in this case.

If the information represents that the current coding unit is segmented, the size of a segmented coding unit corresponds to half of the size of the current coding unit, and the current coding unit is segmented into four square coding units on the basis of the current processing position. The above-mentioned processing can be repeated on the segmented coding units.

Picture prediction (motion compensation) for coding is performed on a coding unit (that is, a leaf node of a coding unit tree) which is not segmented any more. A basic unit on which picture prediction is performed is referred to as a prediction unit or a prediction block. The prediction unit may be segmented into sub-prediction units in various forms including a symmetrical form such as a square and a rectangle, an asymmetrical form, and a geometric form. For example, one prediction unit can be segmented into 2N×2N, 2N×N and N×2N sub-prediction units, as shown in FIG. 5. A bitstream may include information representing whether the prediction unit is segmented or information about the segmentation form of the prediction unit. This information may be derived from other information. The term 'partition' described in the specification may be used to replace the prediction unit or sub-prediction unit. However, the present invention is not limited thereto.

To restore the current unit on which decoding is performed, the current picture including the current unit or decoded parts of other pictures may be used. A picture (slice) that uses only the current picture for restoration, that is, performs only inter prediction is referred to as an intra picture or I-picture (slice), a picture (slice) that uses one motion vector and reference index to predict each unit is referred to as a predictive picture or P-picture (slice), and a picture (slice) that uses a maximum of two motion vectors and reference indexes is referred to as a bi-predictive picture or B-picture (slice).

The intra predictor performs intra prediction that predicts pixel values of a target unit from restored regions in the current picture. For example, the intra predictor can predict pixel values of the current unit from pixels of units located at the top, left, top left and/or top right of the current unit.

The intra mode can include a vertical mode, a horizontal mode, a DC mode and an angular mode according to direction and prediction scheme of a reference region in which reference pixels used for pixel value prediction are located. The vertical mode uses a value of a vertical neighboring region of a target unit as a prediction value of the current unit, whereas the horizontal mode uses a horizontal neighboring region of the target unit as a reference region. The DC mode uses the average of reference regions. The angular mode is used when a reference region is located in an arbitrary direction. In the angular mode, the direction can be indicated by an angle between the current pixel and a reference pixel. For convenience, predetermined angles and prediction mode numbers may be used and the number of angles may depend on the size of a target unit.

Several specific modes may be defined and used for the aforementioned prediction methods. While the prediction mode may be transmitted as a value indicating the prediction mode, a method of predicting a prediction mode value of the current block can be used in order to improve transmission efficiency. Here, the decoder can acquire the prediction mode of the current block using information which represents whether a prediction value for the prediction mode is used without being change and information which indicates a difference between the prediction value and the actual value.

The inter predictor performs inter prediction that predicts pixel values of a target unit using information about restored pictures other than the current picture. A picture used for prediction is referred to as a reference picture. A reference region used to predict the current unit can be represented using an index indicating a reference picture and a motion vector.

Inter prediction includes forward prediction, backward prediction and bi-directional prediction. Forward prediction uses one reference picture displayed (or output) prior to the current picture, whereas backward prediction uses one reference picture displayed (or output) after the current picture. For backward prediction, one piece of motion information (e.g. a motion vector and a reference picture index) may be needed. Bi-directional prediction can use a maximum of two reference regions. These two reference regions may be included in the same reference picture or respectively included in different reference pictures. That is, bi-directional prediction can use a maximum of two pieces of motion information (e.g. motion vectors and reference picture indexes) and two motion vectors may have the same reference picture index or respectively have different reference picture indexes. Here, the reference pictures can be displayed (or output) before and after the current picture.

A prediction unit coded in the inter mode may be segmented into partitions in an arbitrary form (e.g. a symmetrical form, asymmetrical form or geometrical form). Each partition can be predicted from one or two reference pictures as described above.

Motion information of the current prediction unit may include motion vector information and a reference picture index. The motion vector information may include a motion vector, a motion vector prediction value or a differential motion vector and may represent index information that specifies the motion vector prediction value. The index information that specifies the motion vector prediction value designates a motion vector to be used as a motion vector prediction value of the current partition in motion vector competition which will be described below, from among a plurality of motion vectors included in a motion vector prediction candidate group. It is possible to directly designate the motion vector to be used to predict the motion vector of the current partition from among the motion vector prediction candidate group by transmitting the index information. Otherwise, an indirect method of using one of motion vectors included in the motion vector prediction candidate group according to predetermined priority may be used without transmitting the index information. The differential motion vector represents a difference between the motion vector and the motion vector prediction value.

It is possible to acquire a reference unit of the current prediction unit using a motion vector and a reference picture index. The reference unit is present in a reference picture having the reference picture index. A pixel value or interpolated value of a unit specified by the motion vector may be used as a prediction value of the current prediction unit. That is, motion compensation that predicts the current prediction unit from a previously decoded picture using motion information is performed.

For the current picture, a reference picture list can be generated using pictures used for inter prediction. In the case of B-picture, two reference picture lists, which are referred to as reference picture list 0 (or List 0) and reference picture list 1 (or List 1) in the following description, are needed.

In order to reduce transmission traffic related to motion vectors, it is possible to employ a method of acquiring a motion vector prediction value using motion information about previously coded units and transmitting only a motion vector difference with respect to the motion vector prediction value. The decoder obtains a motion vector prediction value of the current unit using motion information about other decoded units and acquires a motion vector of the current unit using a motion vector difference transmitted thereto.

Figures 5, 6:
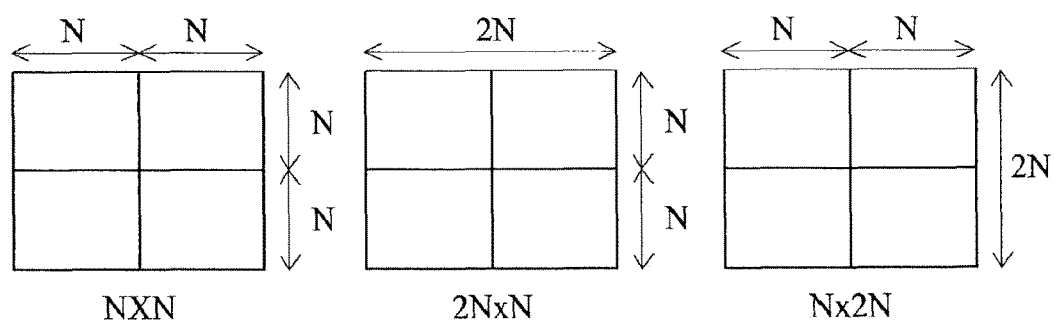
FIG. 5 illustrates various segmentation forms of a prediction unit according to embodiments of the present invention.
FIG. 6 illustrates exemplary spatial neighboring partitions of the current partition.

Referring to FIG. 6, for example, if a partition located on the left of the current prediction unit (partition) is neighboring partition A, a partition located at the top of the current prediction unit is neighboring partition B, a partition located at the top right of the current prediction unit is neighboring partition C, and motion vectors of neighboring partitions A, B and C are respectively MV_a, MV_b and MV_c, a motion vector prediction value MVp of the current partition can be derived from the median of horizontal and vertical components of MV_a, MV_b and MV_c. If decoding information about the neighboring partition C cannot be obtained, the neighboring partition D located at the top left of the current partition and the motion vector MV_d thereof can replace the decoding information about the neighboring partition C.

If the motion vector of a neighboring partition is used to obtain the motion vector prediction value MVp of the current partition even when the reference picture of the neighboring partition is different from the reference picture of the current partition, accurate motion vector prediction is limited. Accordingly, the present invention uses a method of scaling a neighboring partition motion vector to perform more accurate motion vector prediction.

Motion vector scaling is a technique of linearly interpolating a motion vector using a temporal distance between the current picture and a reference picture of each partition (current partition and neighboring partitions). That is, motion vector scaling linearly interpolates a motion vector of a neighboring partition using the ratio of a temporal distance between the current picture and a reference picture of the neighboring partition to a temporal distance between the current picture and a reference picture of the current partition.

More specifically, a scaled motion vector MV'x can be obtained by the following equation 1.

$$MV'x = \{(f_{ME} - f_c)/(f_x - f_c)\} \times MVx \qquad \text{[Equation 1]}$$

Here, MVx denotes one of the motion vectors MV_a, MV_b, MV_c and MV_d of the neighboring partitions and MV'x denotes a scaled value of MVx. In addition, fx indicates the number of the reference picture of the corresponding neighboring partition, $f_{ME}$ represents the number of the reference picture of the current partition, and fc denotes the number of the current picture. The motion vector of a neighboring partition can be down-scaled or up-scaled through linear interpolation such that the motion vector corresponds to the reference picture of the current partition, and error caused by a reference picture difference between partitions can be reduced.

Figure 7:
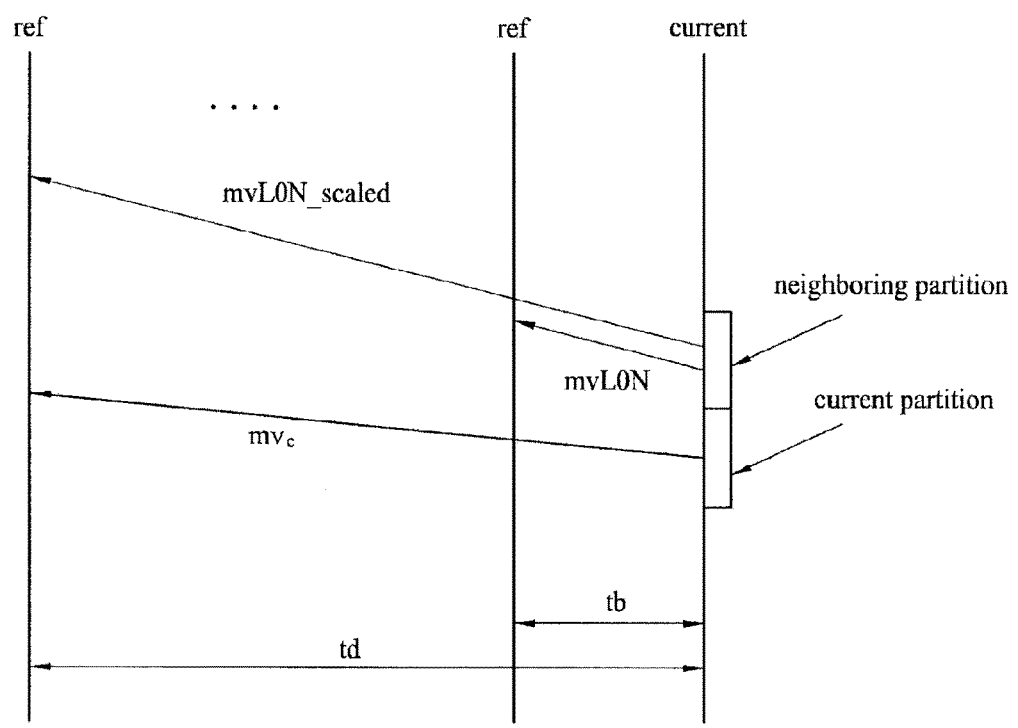
FIGS. 7 and 8 illustrate methods of scaling a motion vector of a neighboring partition.
Figure 8:
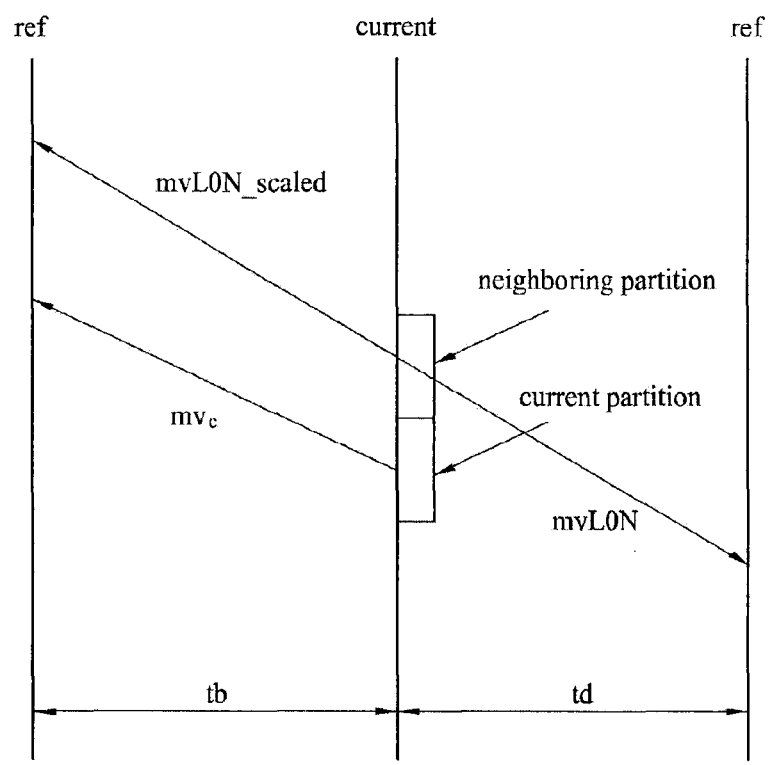

According to an embodiment of the present invention, motion vector scaling through calculation of integers can be performed. Referring to FIGS. 7 and 8, a scaled value mvL0N_scaled of a motion vector mvL0N of a neighboring partition can be obtained using the ratio (DistScaleFactor) of a temporal distance td between the reference picture of the neighboring partition and the current picture to a temporal distance tb between the reference picture of the current partition and the current picture, as expressed by the following equation.

$$mvL0N\_scaled = (DistScaleFactor * mvL0N + 128) >> 8 \qquad \text{[Equation 2]}$$

Here, DistScaleFactor can be obtained by the following equation, as defined in MPEG-4 AVC/H.264.

$$DistScaleFactor = Clip3(-1024, 1023, (tb * tx + 32) >> 6) \qquad \text{[Equation 3]}$$

Here, tx=(16384+Abs(td/2))/td.

The motion vector of the neighboring partition, which is selected for motion vector prediction of the current partition, can be converted into a scaled value on the basis of the temporal distance ratio (tb/td) of the pictures. When the motion vector prediction direction of the selected neighboring partition is different from the motion vector prediction direction of the current partition, the motion vector of the neighboring partition can be scaled in the reverse direction, as shown in FIG. 8.

The above-described motion vector scaling method can be used to improve the accuracy of motion vector prediction of the current partition. For example, the motion vector prediction value MVp of the current partition can be obtained as follows using the motion vectors MV_a, MV_b, MV_c and MV_d of the neighboring partitions A, B, C and D as shown in FIG. 6.

When one of reference indexes refidx_a, refidx_b, refidx_c and refidx_d of the neighboring partitions A, B, C and D is identical to the reference index refidx of the current partition (e.g., when the reference index refidx_a is equal to the reference index refidx of the current partition), one of i) the median of "MV_a", "scaled value of MV_b" and "scaled value of MV_c", ii) the median of "MV_a", "scaled value of MV_b", "scaled value of MV_c" and "scaled value of "MV_d", iii) the average of "MV_a" and "scaled value of MV_b (MV_b being the motion vector of the neighboring partition B having the reference index closest to the reference index of the current partition)", and iv) "MV_a" can be acquired as the motion vector prediction value MVp of the current partition.

When two of the reference indexes refidx_a, refidx_b, refidx_c and refidx_d of the neighboring partitions A, B, C and D are identical to the reference index refidx of the current partition (e.g., when the reference indexes refidx_a and refidx_b are equal to the reference index refidx of the current partition), one of i) the median of "MV_a", "MV_b" and "scaled value of MV_c", ii) the median of "MV_a", "MV_b", "scaled value of MV_c" and "scaled value of "MV_d", iii) the average of "MV_a" and "MV_b", and iv) "MV_a (or MV_b)" can be acquired as the motion vector prediction value MVp of the current partition.

When three of the reference indexes refidx_a, refidx_b, refidx_c and refidx_d of the neighboring partitions A, B, C and D are identical to the reference index refidx of the current partition (e.g., when the reference indexes refidx_a, refidx_b and refidx_c are equal to the reference index refidx of the current partition), one of i) the median of "MV_a", "MV_b" and "MV_c", ii) the median of "MV_a", "MV_b", "MV_c" and "scaled value of "MV_d", iii) the average of "MV_a", "MV_b" and "MV_c", and iv) "MV_a (or MV_b or MV_c)" can be acquired as the motion vector prediction value MVp of the current partition.

When any of the reference indexes refidx_a, refidx_b, refidx_c and refidx_d of the neighboring partitions A, B, C and D is not identical to the reference index refidx of the current partition, one of i) the median of "scaled value of MV_a", "scaled value of MV_b" and "scaled value of MV_c", ii) the median of "scaled value of MV_a", "scaled value of MV_b", "scaled value MV_c" and "scaled value of "MV_d", and iii) the median of "scaled value of MV_a", "scaled value of "MV_b" and "scaled value of "MV_d" can be acquired as the motion vector prediction value MVp of the current partition.

The above-mentioned method of obtaining the motion vector prediction value MVp of the current partition using the median or average of the motion vectors (or scaled motion vectors) of the neighboring partitions is exemplary and the present invention is not limited thereto. That is, while the four neighboring partitions (left, top, top left and top right partitions) of the current partition can be used as described above, three neighboring partitions (left, top and top right partitions) may also be used.

Furthermore, the aforementioned motion vector scaling method can be performed on a temporal neighboring partition of the current partition as well as a spatial neighboring partition thereof to predict the motion vector of the current partition. The spatial neighboring partition of the current partition is a partition located at the left or top of the current partition in the same picture (or slice) as that of the current partition. The temporal neighboring partition of the current partition is located in the position corresponding to the current partition in a picture different from the picture corresponding to the current partition, such as a co-located partition of the current partition. According to an embodiment of the present invention, it is possible to obtain the motion vector prediction value of the current partition using the motion vectors of the temporal neighboring partition as well as the motion vector of the spatial neighboring partition, which will be described in detail below.

According to the present invention, as described above, when motion vector prediction is performed using a motion vector of a neighboring partition having a reference index (or reference picture) different from that of the current partition, it is possible to improve the accuracy of motion vector prediction by scaling the motion vector of the neighboring partition.

According to an embodiment of the present invention, it is possible to use a motion vector of a neighboring partition having a reference picture list different from that of the current partition as well as a motion vector of a neighboring partition having the same reference picture list and the same reference index as those of the current partition, for motion vector prediction of the current partition.

Figure 9:
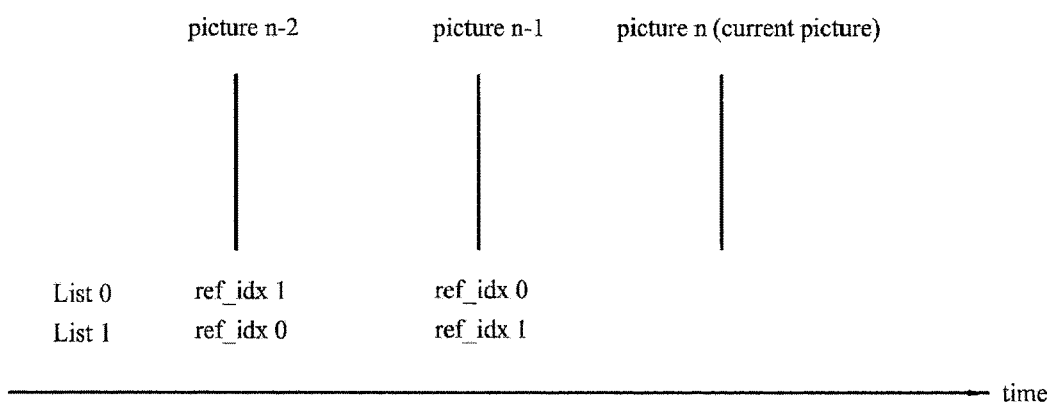
FIG. 9 illustrates an example of referring to the same reference picture from different reference picture lists.

As described above, a B-slice that performs bi-directional prediction has two reference picture lists: reference picture list 0 (List 0) and reference picture list (List 1). Prediction using List 0 is referred to as L0 prediction and prediction using List 1 is referred to as L1 prediction. Referring to FIG. 9, the B-slice may indicate the same reference picture from different reference picture lists. This situation can occur in a low-delay environment in which only a previous picture is referred to. In FIG. 9, picture n−1 corresponds to the first reference picture of List 1 while being the 0-th reference picture of List 0, and picture n−2 corresponds to the 0-th reference picture of List 1 while being the first reference picture of List 0.

Accordingly, the present invention can use a motion vector of a neighboring partition that refers to the same reference picture as that of the current partition for motion vector prediction of the current partition even though the current partition and the neighboring partition use different reference picture lists. Here, whether a partition refers to the same reference picture from different reference picture lists can be determined on the basis of picture order count (POC).

POC represents a number assigned to the picture in temporal order. Accordingly, reference pictures having POCs smaller than the POC of a target coding picture are past pictures, whereas reference pictures having POCs larger than the POC of the target coding picture are future pictures.

FIGS. 10 and 11 show exemplary neighboring partitions having the same reference picture as that of the current partition and reference picture lists different from that of the current partition. In FIGS. 10 and 11, predFlagL0 and predFlagL1 are list flag values that indicate whether a corresponding partition refers to reference picture lists List0 and List1. When a list flag value is 1, the corresponding partition refers to the corresponding reference picture list. When the list flag value is 0, the corresponding partition does not refer to the corresponding reference picture list. refIdxL0 and refIdxL1 are reference index values in corresponding lists when the list flag values predFlagL0 and predFlagL1 corresponding thereto are 1. The reference index value is set to −1 when a list flag value corresponding thereto is 0, that is, the corresponding reference picture list is not referred to.

Referring to FIG. 10, the current partition Cur has a value predFlagL0 of 1 which indicates L0 prediction and a value refIdxL0 of 0, and thus a motion vector of the current partition Cur can be predicted using motion vectors of neighboring partitions A and C which have the same list flag value predFlagL0 of 1 (the same reference picture list) and the same reference index refIdxL0 of 0 as those of the current partition Cur. The partition B has a value predFlagL0 of 0 which is different from that of the current partition, a value predFlagL1 of 1 indicating L1 prediction, and a value refIdxL1 of 1. A POC of a picture corresponding to the reference index ref idx, 1, of List1 is 4 which equal the POC of the picture corresponding to the reference index of 0 of List0, which is referred to by the current partition. This represents that the partition B and the current partition refer to the same reference picture. The present invention can use the motion vector of a partition that refers to the same reference picture (the same POC) as that of the current partition for motion vector prediction of the current partition even if the reference picture is from different reference picture lists. Accordingly, in FIG. 10, the motion vector prediction value of the current partition can be acquired using the median of the motion vector of the partition A in the L0 direction, the motion vector of the partition B in the L1 direction and the motion vector of the partition C in the L0 direction.

Referring to FIG. 11, the current partition Cur has a value predFlagL0 of 1 that indicates L0 prediction, the partitions B and C have values predFlagL0 and predFlagL1 of 0 that indicates intra prediction, and the partition A has a value predFlagL1 of 1 that indicates L1 prediction. The POC value, 4, of the picture corresponding to the reference index ref_idx, 0, of List0 referred to by the current partition equals to the POC value of the picture corresponding to the reference index ref_idx, 1, of List1 referred to by the partition A. This represents that the partition A and the current partition refer to the same reference picture. Accordingly, the present invention can use the motion vector of the partition A in L1 direction for motion vector prediction of the current partition.

As described above, the embodiments of the present invention can select a motion vector of an inter mode partition which has the same POC as that of the current partition, that is, the same reference picture as that of the current partition even if the reference picture is from different reference picture lists in addition to a motion vector of an inter mode partition having the same reference index of the same reference picture list as those of the current partition among neighboring partitions and use the motion vectors for motion vector prediction of the current partition.

The technique of predicting the motion vector of the current partition may be extended to an advanced motion vector prediction (AMVP) technique that collects a motion vector prediction candidate group from spatial and temporal neighboring partitions of the current partition and acquires the motion vector prediction value of the current partition. To select the best motion vector from motion vector candidates included in the motion vector prediction candidate group to use the best motion vector as a motion vector prediction value is referred to as motion vector competition.

Figure 12:
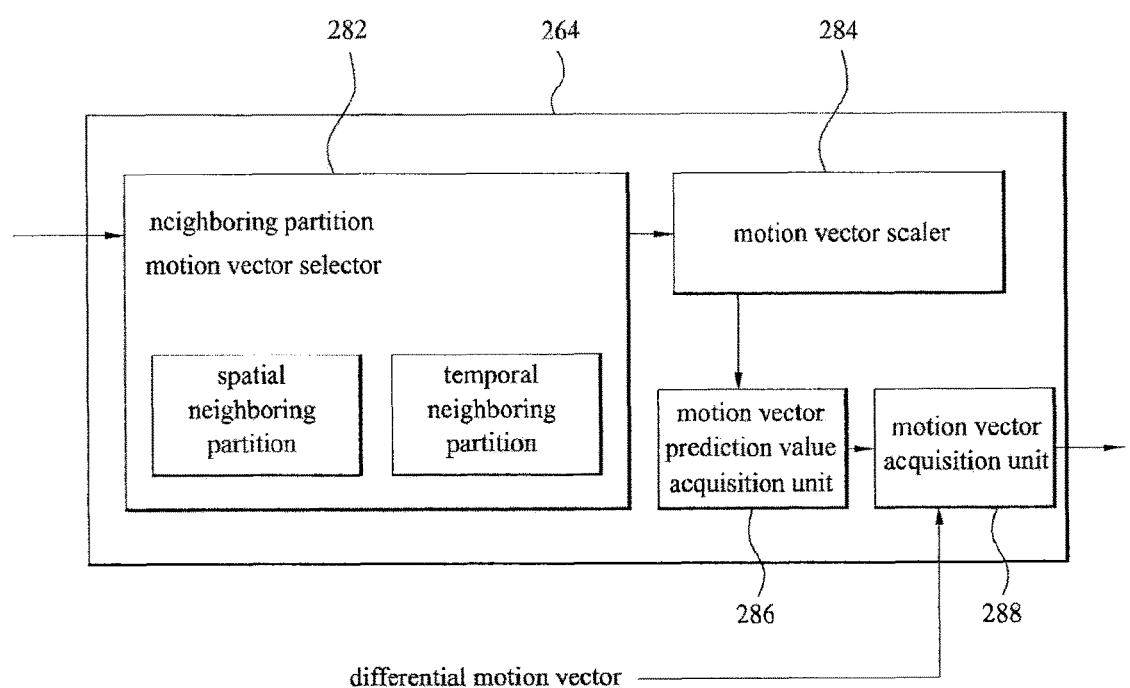
FIG. 12 is a block diagram of a motion estimator of the video signal decoder according to an embodiment of the present invention.

Referring to FIG. 12, the motion estimator 264 of the video signal decoder according to the present invention may include a neighboring partition motion vector selector 282 that selects a neighboring partition motion vector to be included in a motion vector prediction candidate group of the current partition, a motion vector scaler 284 that scales the selected neighboring partition motion vector when a reference picture of the neighboring partition is different from that of the current partition, a motion vector prediction value acquisition unit 286 that acquires a motion vector prediction value of the current partition using the motion vector prediction candidate group including the scaled neighboring partition motion vector, and a motion vector acquisition unit 288 that acquires a motion vector of the current partition using the motion vector prediction value. The neighboring partition motion vector selector 282 can collect motion vector candidates from spatial and temporal neighboring partitions of the current partition. The motion vector acquisition unit 288 can calculate the motion vector of the current partition by summing the motion vector prediction value obtained through the motion vector prediction value acquisition unit 286 and a differential motion vector.

The motion estimator 164 of the video signal encoder according to the present invention may include a neighboring partition motion vector selector, a motion vector scaler, a motion vector prediction value acquisition unit, and a motion vector acquisition unit, which have the same functions as those of the aforementioned motion estimator 264 of the video signal decoder according to the present invention.

Figure 13:
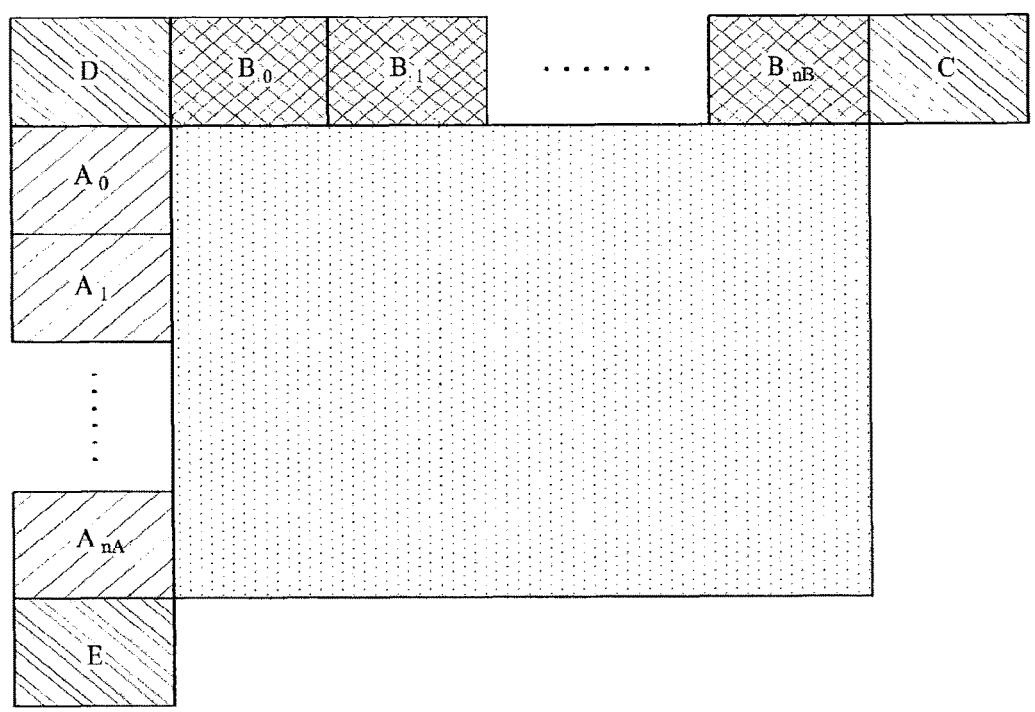
FIGS. 13 and 14 show spatial neighboring partitions from which motion vectors to be included in a motion vector prediction candidate group of the current partition are selected according to embodiments of the present invention.

Referring to FIG. 13, the motion vector prediction candidate group of the current partition may include a motion vector a' selected from a left group corresponding to a group of left neighboring partitions $A_0, A_1, \ldots, A_{nA}$ of the current partition, a motion vector b' selected from a top group corresponding to a group of top neighboring partitions $B_0, B_1, \ldots, B_{nB}$ of the current partition, and a motion vector c' selected from a corner group corresponding to a group of partitions C, D and E which are diagonally adjacent to the current partition.

The median of the motion vectors a', b' and c' can be derived and included in the motion vector prediction candidate group. In this case, it is possible to use 1) the median of the three motion vectors a', b' and c' when the motion vectors a', b' and c' are all available, ii) the median of two of the motion vectors a', b' and c' by allocating 0 to the unavailable motion vector when only the two motion vectors are available, iii) an available motion vector when only one of the three motion vectors is available, and iv) 0 when all three motion vectors are unavailable. The motion vectors a', b' and c' are not included in the motion vector prediction candidate group when available values cannot be set therefor.

In addition to the motion vectors of the aforementioned spatial neighboring partitions, a motion vector of a temporal neighboring partition may be included in the motion vector prediction candidate group. In this case, the motion vector of the temporal neighboring partition may be adaptively included in the motion vector prediction candidate group. That is, temporal competition information that represents whether the motion vector of the temporal neighboring partition is used for motion vector competition can be additionally used. Accordingly, when motion vector competition is used for acquisition of a motion vector prediction value of the current prediction unit, it is possible to restrict use of the motion vector of the temporal neighboring partition as a motion vector prediction candidate on the basis of the temporal competition information. The temporal competition information is subjected to motion vector competition, and thus the temporal competition information can be acquired only when motion competition indication information indicates that motion vector competition is used.

The motion vectors a', b' and c' to be included in the motion vector prediction candidate group, shown in FIG. 13, may be selected from the groups (left group, top group and corner group) of the spatial neighboring partitions of the current partition through various methods.

Partitions in each group can be sequentially searched from one direction to the other direction for inter mode partitions having the same reference picture list and the same reference index as those of the current partition, and a motion vector of the first detected partition can be included in the motion vector prediction candidate group.

Alternatively, partitions in each group can be sequentially searched from one direction to the other direction for partitions having the inter mode regardless of reference picture lists and reference indexes, and a motion vector of the first detected partition can be included in the motion vector prediction candidate group. In this case, the motion vector selected from each group includes a value scaled according to the embodiment of the present invention.

Alternatively, a motion vector of a partition having the inter mode can be selected only in the case in which an available motion vector cannot be searched through reference picture lists and reference indexes for each group. That is, i) partitions in each group can be sequentially searched from one direction to the other direction for inter mode partitions having the same reference picture list and the same reference index as those of the current partition, and a motion vector of the first detected partition can be included in the motion vector prediction candidate group. If there is no available motion vector, ii) partitions in each group can be sequentially searched from one direction to the other direction for partitions having the inter mode, a motion vector of the first detected partition can be selected, and a scaled value of the motion vector can be included in the motion vector prediction candidate group.

Figure 16:
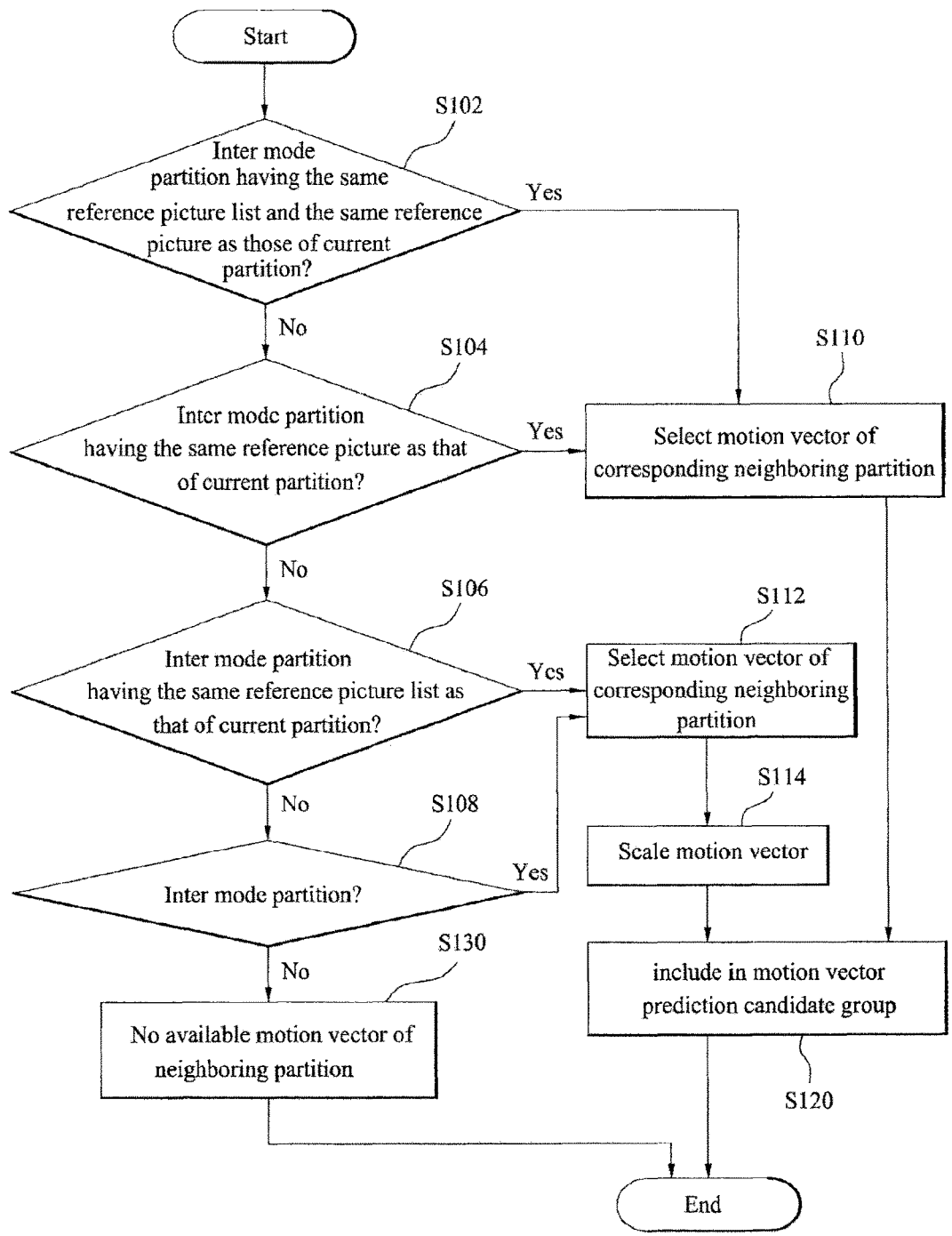
FIG. 16 is a flowchart illustrating motion vector prediction candidate group selection conditions of the present invention.

Otherwise, it is possible to set the following motion vector prediction candidate group selection conditions in order to select available motion vectors to be included in the motion vector prediction candidate group for each group. The motion vector prediction candidate group selection conditions according to the present invention will now be described with reference to FIG. 16.

i) (Condition 1) It is checked whether a neighboring partition is an inter mode partition having the same reference picture list and the same reference picture as those of the current partition (S102). Here, inter mode partitions having the same reference picture list and the same reference picture as those of the current partition are searched.

ii) When condition 1 is not satisfied, (condition 2) it is checked whether a neighboring partition is an inter mode partition having the same reference picture as that of the current partition (S104). In this case, inter mode partitions having the same reference picture as that of the current partition while having a reference picture list different from that of the current partition are searched.

iii) When conditions 1 and 2 are not satisfied, (condition 3) it is checked whether a neighboring partition is an inter mode partition having the same reference picture as that of the current partition (S106). In this case, inter mode partitions having the same reference picture list as that of the current partition while having a reference picture different from that of the current partition are searched.

iv) When conditions 1, 2 and 3 are not satisfied, (condition 4) it is checked whether a neighboring partition is an inter mode partition (S108). In this case, inter mode partitions that do not meet conditions 1, 2 and 3, that is, inter mode partitions having a reference picture list and a reference picture different from those of the current partition, are searched.

To collect the motion vector prediction candidate group for motion vector prediction of the current partition, the present invention can check whether the partitions included in the aforementioned groups (left group, top group and corner group) satisfy conditions 1 to 4 by searching the partitions in a predetermined order. In this case, it is possible to search the partitions of each group in various orders according to an appropriate combination of the motion vector prediction candidate group selection conditions and partition position order. The motion vector of the first neighboring partition that satisfies the conditions during the search process can be selected and included in the motion vector prediction candidate group.

If a motion vector of a neighboring partition that satisfies conditions 1 and 2 is selected (S110), the selected motion vector can be included in the motion vector prediction candidate group since the motion vector has the same reference picture as that of the motion vector of the current partition (S120). If a motion vector of a neighboring partition that satisfies conditions 3 and 4 is selected (S112), the selected motion vector can be scaled (S114) and included in the motion vector prediction candidate group (S120). However, if there is no neighboring partition motion vector that satisfies any of conditions 1 to 4, it is considered that an available neighboring partition motion vector is not present (S130).

A description will be given of examples of order of searching neighboring partition motion vectors to be selected as the motion vector prediction candidate group according to combinations of the motion vector prediction candidate group selection conditions and partition position order for neighboring partitions included in each group with reference to Tables 1 to 4. However, the present invention is not limited to the following embodiments and the order of searching neighboring partition motion vectors to be selected as the motion vector prediction candidate group can be changed in various manners.

In the following embodiments, 'condition first search' means a process of sequentially searching partitions in a group, which satisfies one of the motion vector prediction candidate group selection conditions, according to order of positions of the partitions and then repeating the same process for the next condition, and 'partition position first search' means a process of sequentially checking whether a neighboring partition satisfies the four motion vector prediction candidate group selection conditions and then repeating the same process for the next neighboring partition.

That is, 'condition first search' provides higher priority to the motion vector prediction candidate group selection conditions for partitions in each group, whereas 'partition position first search' provides higher priority to the order of positions of partitions in each group. Here, the partition position order is a predetermined order of neighboring partitions from one direction to the other direction.

In Tables 1 to 4, partition 0, partition 1 and partition are partitions in the same group, which are arranged in position order. Partition 0 represents the first partition of the corresponding group and partition 2 represents the last partition of the group. The number of partitions included in a group need not be 3. In Tables 1 to 4, numerals represent search order numbers.

TABLE 1

|             | Partition 0 | Partition 1 | Partition 2 |
|-------------|-------------|-------------|-------------|
| Condition 1 | 1           | 2           | 3           |
| Condition 2 | 4           | 5           | 6           |
| Condition 3 | 7           | 8           | 9           |
| Condition 4 | 10          | 11          | 12          |

Referring to Table 1, condition first search can be performed on partitions in each group. Specifically, partitions 0 to 2 are sequentially searched to locate partitions that satisfy condition 1, and the motion vector of the first detected partition that satisfies condition 1 is selected as a motion vector to be included in the motion vector prediction candidate group. If there is no partition that satisfies condition 1, the partitions 0 to 2 are searched in the same manner for conditions 2, 3 and 4.

TABLE 2

|             | Partition 0 | Partition 1 | Partition 2 |
|-------------|-------------|-------------|-------------|
| Condition 1 | 1           | 5           | 9           |
| Condition 2 | 2           | 6           | 10          |
| Condition 3 | 3           | 7           | 11          |
| Condition 4 | 4           | 8           | 12          |

Referring to Table 2, partition position first search can be performed on partitions in each group. Specifically, it is sequentially checked whether partition 0 satisfies conditions 1 to 4 and, if partition 0 satisfies any of conditions 1 to 4, the motion vector of partition 0 is selected as a motion vector to be included in the motion vector prediction candidate group. When partition 0 does not satisfy any of conditions 1 to 4, the same search process is sequentially performed on partitions 1 and 2.

TABLE 3

|             | Partition 0 | Partition 1 | Partition 2 |
|-------------|-------------|-------------|-------------|
| Condition 1 | 1           | 2           | 3           |
| Condition 2 | 4           | 7           | 10          |
| Condition 3 | 5           | 8           | 11          |
| Condition 4 | 6           | 9           | 12          |

Referring to Table 3, a combination of condition first search and partition position first search can be performed on partitions in each group. Specifically, condition first search with respect to condition 1 is performed on partitions 0, 1 and 2 to sequentially check whether partitions 0, 1 and 2 satisfy condition 1, and the motion vector of the first partition that satisfies condition 1 is selected as a motion vector to be included in the motion vector prediction candidate group.

If there is no partition that satisfies condition 1, partition position first search is performed for the other conditions. Specifically, it is sequentially checked whether partition 0 satisfies conditions 2, 3 and 4 and, if partition 0 satisfies any of condition 2, 3 and 4, the motion vector of partition 0 is selected as a motion vector to be included in the motion vector prediction candidate group. If partition 0 does not satisfy any of conditions 2, 3 and 4, the same search process is performed on partition 1. Accordingly, in the example of Table 3, condition first search is performed using condition 1 as the top priority condition and, when there is no partition that satisfies condition 1, partition position first search is carried out on the other conditions.

TABLE 4

|             | Partition 0 | Partition 1 | Partition 2 |
|-------------|-------------|-------------|-------------|
| Condition 1 | 1           | 5           | 6           |
| Condition 2 | 2           | 7           | 8           |
| Condition 3 | 3           | 9           | 10          |
| Condition 4 | 4           | 11          | 12          |

Referring to Table 4, a combination of condition first search and partition position first search may be performed on partitions in each group. Specifically, partition position first search is performed on partition 0 to sequentially check whether partition 0 satisfies conditions 1 to 4 and, if partition 0 satisfies any of conditions 1 to 4, the motion vector of partition 0 is selected as a motion vector to be included in the motion vector prediction candidate group.

If partition 0 does not satisfy any of conditions 1 to 4, condition first search is performed on the remaining partitions. Specifically, it is sequentially checked whether partitions 1 and 2 meet condition 1 and the motion vector of the first partition that satisfies condition 1 is selected as a motion vector to be included in the motion vector prediction candidate group. If any of partitions 1 and 2 does not satisfy condition 1, the same search process is performed for condition 2. That is, in the example of Table 4, the search process is performed using partition 0 as top priority search condition and, when partition 0 does not meet any of conditions 1 to 4, condition first search is carried out on the remaining partitions.

The motion vectors a', b' and c' selected by the above-mentioned methods proposed by the present invention affects i) the median of the motion vectors a', b' and c' and ii) an increase in the number of motion vectors included in the motion vector prediction candidate group. That is, a neighboring partition motion vector, which is not included in the motion vector prediction candidate group because it is not available, may become available according to motion vector scaling of the present invention and may be included in the motion vector prediction candidate group.

The above two factors are independent of each other and it is possible to determine whether or not motion vector scaling is applied to each factor. For example, if motion vector scaling is applied only to the median of the motion vectors, only the median is changed while the number of motion vector candidates is maintained. If motion vector scaling is applied to increase the number of motion vector candidates, the median equals the value in AMVP but the number of motion vector candidates increases. It is also possible to apply motion vector scaling to both factors.

Figure 14:
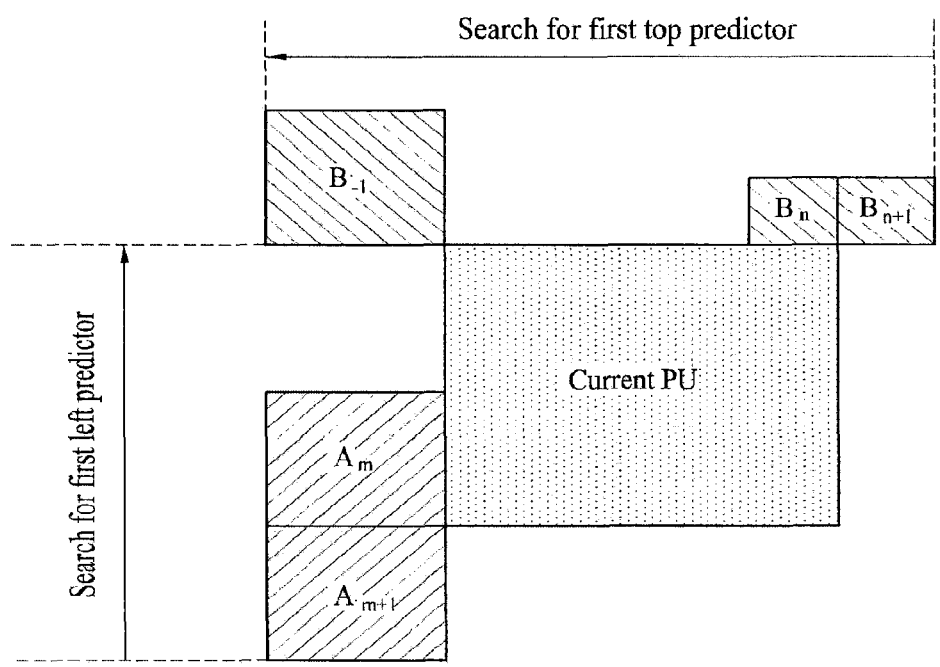

According to the embodiments of the present invention, the range of selection of neighboring partition motion vectors to be included in the motion vector prediction candidate group may be narrowed, as shown in FIG. 14. That is, a bottom left neighboring partition $A_{m+1}$ of the current partition and the lowest partition $A_m$ among left neighboring partitions of the current partition may form a first group and a top right neighboring partition $B_{n+1}$ of the current partition and the rightmost partition $B_n$ among top neighboring partitions of the current partition may form a second group. The motion vector prediction candidate group of the current partition may include the motion vector a' selected from the first group and the motion vector b' selected from the second group. In addition to the motion vectors of the spatial neighboring partitions, motion vectors of temporal neighboring partitions can be included in the motion vector prediction candidate group, as described above. When the number of spatial neighboring partition motion vectors included in the motion vector prediction candidate group is reduced in this manner, computation time and complexity required to select neighboring partition motion vectors can be decreased.

A description will be given of the order of searching neighboring partition motion vectors to be included in the motion vector prediction candidate group according to combinations of the motion vector prediction candidate group selection conditions and partition position order for the first and second groups which have a reduced number of motion vector candidates. In the following embodiments, definitions of 'motion vector prediction candidate group selection conditions' and 'partition position order' correspond to those in the examples of Tables 1 to 4. The present invention is not limited to the following embodiments and the search order can be changed in various manners. In addition, in the following embodiments, a motion vector of a selected partition is used when the partition satisfies condition 1 or 2 and a scaled motion vector of the partition is used when the partition meets condition 3 or 4, as described above.

TABLE 5

|  | $A_m$ | $A_{m+1}$ |
| --- | --- | --- |
| Condition 1 | 1 | 5 |
| Condition 2 | 2 | 6 |
| Condition 3 | 3 | 7 |
| Condition 4 | 4 | 8 |

TABLE 6

|  | $A_m$ | $A_{m+1}$ |
| --- | --- | --- |
| Condition 1 | 5 | 1 |
| Condition 2 | 6 | 2 |
| Condition 3 | 7 | 3 |
| Condition 4 | 8 | 4 |

TABLE 7

|  | $B_{n+1}$ | $B_n$ | $B_{-1}$ |
| --- | --- | --- | --- |
| Condition 1 | 1 | 5 | 9 |
| Condition 2 | 2 | 6 | 10 |
| Condition 3 | 3 | 7 | 11 |
| Condition 4 | 4 | 8 | 12 |

Referring to Tables 5 to 7, partition position first search can be performed on partitions in each group. As shown Table 5, it is sequentially checked whether the partition $A_m$ of the first group satisfies conditions 1 to 4 and the motion vector of the partition $A_m$ is selected as a motion vector to be included in the motion vector prediction candidate group if the partition $A_m$ satisfies any of conditions 1 to 4. If the partition $A_m$ does not satisfy any of conditions 1 to 4, the same search process is performed on the partition $A_{m+1}$.

Referring to Table 6, the partition search order is changed, the search process is performed on the partition $A_{m+1}$ first and, if the partition $A_{m+1}$ does not satisfy any of conditions 1 to 4, the search process is performed on the partition $A_m$. This partition position first search can be performed on the partitions in the second group in the same manner, as shown in Table 7.

TABLE 8

|  | $A_m$ | $A_{m+1}$ |
| --- | --- | --- |
| Condition 1 | 1 | 2 |
| Condition 2 | 3 | 4 |
| Condition 3 | 5 | 6 |
| Condition 4 | 7 | 8 |

TABLE 9

|  | $B_{n+1}$ | $B_n$ | $B_{-1}$ |
| --- | --- | --- | --- |
| Condition 1 | 1 | 2 | 3 |
| Condition 2 | 4 | 5 | 6 |
| Condition 3 | 7 | 8 | 9 |
| Condition 4 | 10 | 11 | 12 |

Referring to Tables 8 and 9, condition first search can be performed on partitions in each group. That is, the partitions of the first and second groups are sequentially searched for partitions that satisfy condition 1 and the motion vector of the first partition that satisfies condition 1 is selected as a motion vector to be included in the motion vector prediction candidate group. When there is no partition that meets condition 1, the same search process can be performed on the partitions of the first and second groups for conditions 2, 3 and 4.

TABLE 10

|  | $A_m$ | $A_{m+1}$ |
| --- | --- | --- |
| Condition 1 | 1 | 2 |
| Condition 2 | 3 | 6 |
| Condition 3 | 4 | 7 |
| Condition 4 | 5 | 8 |

TABLE 11

|  | $A_m$ | $A_{m+1}$ |
| --- | --- | --- |
| Condition 1 | 2 | 1 |
| Condition 2 | 6 | 3 |
| Condition 3 | 7 | 4 |
| Condition 4 | 8 | 5 |

TABLE 12

|  | $B_{n+1}$ | $B_n$ | $B_{-1}$ |
| --- | --- | --- | --- |
| Condition 1 | 1 | 2 | 3 |
| Condition 2 | 4 | 7 | 10 |
| Condition 3 | 5 | 8 | 11 |
| Condition 4 | 6 | 9 | 12 |

Referring to Tables 10, 11 and 12, a combination of condition first search and partition position first search can be performed on partitions in each group. Specifically, condition first search is performed for condition 1 to sequentially search the partitions of the first and second groups according to partition position order for partitions that satisfy condition 1, and the motion vector of the first partition that meets condition 1 is selected as a motion vector to be included in the motion vector prediction candidate group.

If there is no partition that satisfies condition 1, partition position first search is performed for the other conditions.

Specifically, referring to Table 10, it is sequentially checked whether the partition $A_m$ of the first group satisfies conditions 2, 3 and 4 and, when the partition $A_m$ satisfies any of conditions 2, 3 and 4, the motion vector of the partition $A_m$ is selected as a motion vector to be included in the motion vector prediction candidate group. If the partition $A_m$ does not satisfy any of conditions 2, 3 and 4, the same search process is performed on the partition $A_{m+1}$. The partition search order for partition position first search may be changed, as shown in Table 11. The aforementioned search process can be performed on the partitions of the second group in the same manner, as shown in Table 12.

According to the examples of Tables 10 to 12, the search process is performed using condition 1 as the top priority search condition and, when there is no partition that satisfies condition 1, partition position first search is performed on the other conditions.

TABLE 13

|  | $A_m$ | $A_{m+1}$ |
|---|---|---|
| Condition 1 | 2 | 1 |
| Condition 2 | 4 | 3 |
| Condition 3 | 7 | 5 |
| Condition 4 | 8 | 6 |

TABLE 14

|  | $A_m$ | $A_{m+1}$ |
|---|---|---|
| Condition 1 | 3 | 1 |
| Condition 2 | 4 | 2 |
| Condition 3 | 7 | 5 |
| Condition 4 | 8 | 6 |

TABLE 15

|  | $B_{n+1}$ | $B_n$ | $B_{-1}$ |
|---|---|---|---|
| Condition 1 | 1 | 2 | 3 |
| Condition 2 | 4 | 5 | 6 |
| Condition 3 | 7 | 9 | 11 |
| Condition 4 | 8 | 10 | 12 |

TABLE 16

|  | $B_{n+1}$ | $B_n$ | $B_{-1}$ |
|---|---|---|---|
| Condition 1 | 1 | 3 | 5 |
| Condition 2 | 2 | 4 | 6 |
| Condition 3 | 7 | 9 | 11 |
| Condition 4 | 8 | 10 | 12 |

Referring to Tables 13 to 16, a search process is performed on partitions in each group for conditions 1 and 2 and, when an available motion vector cannot be selected through the search process for conditions 1 and 2, a search process for conditions 3 and 4 is carried out on the partitions in each group. In this case, the search process for conditions 1 and 2 and the search process for conditions and 4 can use any one of condition first search and partition position first search. In the embodiments of the present invention, it is not necessary to perform motion vector scaling on neighboring partitions that satisfy conditions 1 and 2 because the neighboring partitions refer to the same reference picture as that of the current partition. The motion vectors of the neighboring partitions that do not require motion vector scaling can be searched preferentially so as to reduce the frequency and complexity of the motion vector scaling process.

Furthermore, the present invention can omit search of some partitions in order to reduce complexity by decreasing the number of search cases. For example, only the first to fifth partitions of the first group can be searched by omitting search of the sixth, seventh and eighth partitions. Otherwise, search of the sixth, seventh, eighth, tenth, eleventh and twelfth partitions of the second group can be omitted in the case of Table 7, and search of the fifth, sixth, eighth, ninth, eleventh and twelfth partitions of the second group can be omitted in the case of Table 9. That is, it is possible to combine condition first search for one of the motion vector prediction candidate group selection conditions and position first search for one partition in each group.

Figure 15:
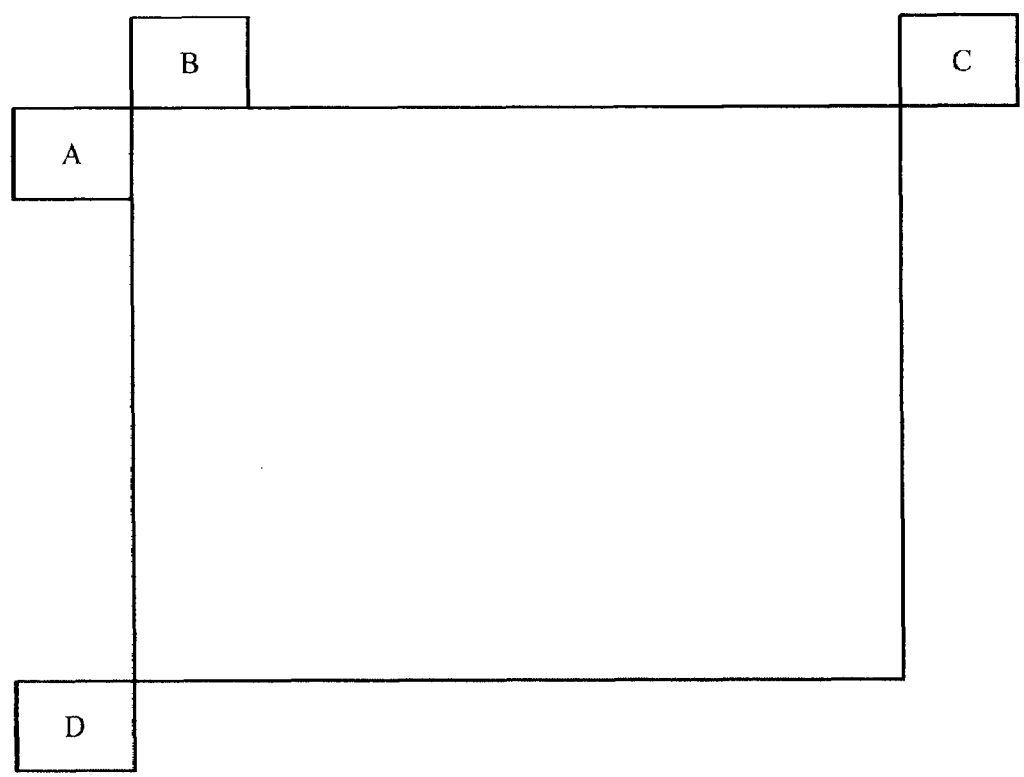
FIG. 15 shows neighboring partitions to be merged with the current partition in a merge mode.

To reduce the quantity of transmission information related to inter prediction, the merge mode, skip mode or prediction mode which will be described below may be used Referring to FIG. 15, in the merge mode, a partition can be merged with vertical, horizontal or diagonal neighboring partitions A, B, C or D. Here, merging serves to acquire prediction information for inter picture prediction of the current partition from inter prediction information of a neighboring partition. Partition merging can be represented using information indicating whether a corresponding partition is merged (e.g., merge_flag), information indicating which partition (e.g., the top partition A among left neighboring partitions, the leftmost partition B among top neighboring partitions, the top right neighboring partition C or the bottom left neighboring partition D) is merged, etc. This information indicating which partition is merged can be acquired only when merging of the current partition is indicated (merge_flag=1).

In the merge mode, motion information of the current partition can be acquired using motion information of four or fewer spatial neighboring partitions and motion information of one temporal neighboring partition as the information indicating which partition is merged.

The skip mode uses motion information of a previously coded partition as motion information about the current partition when the current partition is restored. Accordingly, information other than information indicating a to-be-skipped partition is not transmitted in the skip mode. In this case, motion information necessary for prediction can be derived from neighboring partition motion vectors.

In the skip mode, pixel values of a reference region in a previously coded reference picture can be used. The pixel values of the reference region may be accompanied by motion compensation using a motion vector prediction value. However, the current partition may have motion vector information when motion vector competition is used when the motion vector prediction value is acquired.

When the current partition is not coded in the skip mode, the current partition can be directly coded in the prediction mode. The direct prediction mode predicts the motion information of the current partition from motion information of a decoded partition. The direct prediction mode is distinguished from the skip mode in that the current partition has a residual.

According to the embodiments of the present invention, it is possible to unify methods of predicting motion information in all modes by applying the method of acquiring motion information of a neighboring partition, used in the merge mode, to the skip mode and the normal inter mode. That is, motion information of a spatial neighboring partition is used in the skip mode and normal inter mode as in the merge mode, instead of performing a search process in a predetermined order to obtain available motion information in the skip mode and normal inter mode. However, since the reference index or prediction direction of the current partition is known in the skip mode or normal inter mode, distinguished from the merge mode, it is possible to use a motion vector of a neighboring partition as an available motion vector included in the motion vector prediction candidate group when the neighboring partition has the same reference picture as that of the current partition and to exclude the motion vector of the neighboring partition from the motion vector prediction candidate group by processing the motion vector as an unavailable motion vector when the reference picture of the neighboring partition is different from the reference picture of the current partition. Alternatively, when the reference picture of the neighboring partition is different from the reference picture of the current partition, it is possible to calculate a motion vector corresponding to the motion information of the current partition using the motion vector scaling method proposed by the present invention and use the calculated motion vector as a motion vector included in the motion vector prediction candidate group.

To increase the accuracy of motion compensation, pixel accuracy of less than an integer number of pixels can be used. In this case, a pixel value smaller than an integer number of pixels is generated using interpolation of pixel values of a reference picture.

Which one of the inter prediction mode, direct prediction mode, inter prediction mode and skip mode is used for prediction can be represented using prediction mode information or a flag that indicates whether the corresponding mode has been used. In a specific case, the corresponding mode can be derived using other information.

It may be possible to compress motion vectors and transmit the compressed motion vectors to reduce motion vector transmission information. For example, a median filter can be used for motion vectors to be stored to obtain a compression value. To achieve this, information representing whether motion vector compression is used and information about a compression ratio can be additionally transmitted. Furthermore, it is possible to simply store the first top left motion vector, use the motion vector as a reference value, and transmit differences between the reference value and the other motion vectors so as to reduce computation complexity.

Meanwhile, transform (e.g. DCT) of an image is performed in a unit different from the prediction unit. This unit is referred to as a transform unit in the following description. The transform unit normally has a square form for DCT and may be recursively segmented similarly to the coding unit. The size of the transform unit may be set to the most efficient size according to characteristics of the image and may be smaller or larger than the prediction unit. One prediction unit may include a plurality of transform units in general.

The structure and size of the transform unit are similar to those of the coding unit as described above. For example, one transform unit can be recursively segmented into four transform units in a quad tree form. Information about the structure of the transform unit may include a maximum height (or segmentation depth) of a predetermined transform unit tree, a maximum size of the transform unit, a minimum size of the transform unit, the difference between the maximum size and minimum size of the transform unit, and/or logs of these values, a depth of the transform unit and a size of the transform unit, which are derived using the values, etc. The maximum segmentation depth of the transform unit may depend on the prediction mode of the corresponding unit. The size of the coding unit may affect the size of the transform unit.

For the transform unit, it is possible to acquire information representing whether the current transform unit has been segmented. For example, when this information indicates that the corresponding transform unit has been segmented, the corresponding transform unit can be further recursively segmented into four transform units.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

The decoding/encoding methods to which the present invention is applied may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). A bitstream generated according to the encoding method can be stored in a computer readable recording medium or transmitted using a wired/wireless communication network.

The embodiments of the present invention may be implemented by various means, for example, hardware, firmware, software, or combinations thereof. When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electrical units devised to perform the present invention. In some cases, the embodiments of the present invention may be implemented as controllers.

In a software configuration, the embodiments of the present invention may be implemented as software modules. The software modules may execute one or more functions and operations described in the specification. Software code may be implemented as a software application written in an appropriate program language. The software code may be stored in a memory and executed by a controller.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to video signal encoding and decoding.

The invention claimed is:

1. A method for decoding a bitstream for a video signal by a decoding apparatus, the method comprising:
deriving at least one motion vector candidate from at least one neighboring block of a current block;
constructing a motion vector candidate group of the current block, the motion vector candidate group comprising a plurality of motion vector candidates including the derived at least one motion vector candidate;
obtaining a motion vector predictor of the current block from the constructed motion vector candidate group; and
decoding the current block based on the motion vector predictor,
wherein deriving the at least one motion vector candidate includes:
selecting a scaled motion vector of the at least one neighboring block as the at least one motion vector candidate when the at least one neighboring block refers to a reference picture having a different picture order count (POC) value than the current block in a different reference picture list than the current block.

2. The method according to claim 1, wherein the scaled motion vector is obtained based on a temporal distance between the reference picture of the at least neighboring block and a reference picture of the current block.

3. The method according to claim 1, wherein deriving the at least one motion vector candidate further includes:
selecting a motion vector of the at least one neighboring block as the at least one motion vector candidate when the at least one neighboring block refers to a reference picture having a same POC value as the current block in the different reference picture list than the current block.

4. The method according to claim 1, wherein deriving the at least one motion vector candidate further includes:
selecting a motion vector of the at least one neighboring block as the at least one motion vector candidate when the at least one neighboring block refers to a reference picture having a same POC value as the current block in a same reference picture list as the current block.

5. The method according to claim 1, wherein the current block refers to a reference picture list 0, and the at least one neighboring block refers to a reference picture list 1.

6. The method according to claim 1, further comprising:
obtaining index information from the bitstream,
wherein a motion vector candidate specified by the index information from among the motion vector candidate group is assigned to the motion vector predictor of the current block.

7. The method according to claim 1, wherein the at least one neighboring block includes at least one of a bottom left neighboring block of the current block or a left neighboring block adjacent to the current block.

8. The method according to claim 1, wherein the at least one neighboring block includes at least one of a top right neighboring block of the current block, a top neighboring block of the current block, or a top left neighboring block adjacent to the current block.

9. The method according to claim 1, further comprising:
deriving a motion vector candidate from a co-located block of the current block, the co-located block being located in a position corresponding to the current block in a picture different from a picture including the current block,
wherein the motion vector candidate group further comprises the motion vector candidate derived from the co-located block.

10. The method according to claim 1, wherein the POC value represents a number assigned to a picture according to a temporal order of the picture.

11. An apparatus for decoding a bitstream for a video signal, the apparatus comprising:
a memory; and
a processor operatively connected to the memory and configured to:
derive at least one motion vector candidate from at least one neighboring block of a current block,
construct a motion vector candidate group of the current block, the motion vector candidate group comprising a plurality of motion vector candidates including the derived at least one motion vector candidate,
obtain a motion vector predictor of the current block from the constructed motion vector candidate group, and
decode the current block based on the motion vector predictor,
wherein deriving the at least one motion vector candidate includes:
selecting a scaled motion vector of the at least one neighboring block as the at least one motion vector candidate when the at least one neighboring block refers to a reference picture having a different picture order count (POC) value than the current block in a different reference picture list than the current block.

12. The apparatus according to claim 11, wherein the scaled motion vector is obtained based on a temporal distance between the reference picture of the at least neighboring block and a reference picture of the current block.

13. The apparatus according to claim 11, wherein deriving the at least one motion vector candidate further includes:
selecting a motion vector of the at least one neighboring block as the at least one motion vector candidate when the at least one neighboring block refers to a reference picture having a same POC value as the current block in the different reference picture list than the current block.

14. The apparatus according to claim 11, wherein deriving the at least one motion vector candidate further includes:
selecting a motion vector of the at least one neighboring block as the at least one motion vector candidate when the at least one neighboring block refers to a reference picture having a same POC value as the current block in a same reference picture list as the current block.

15. The apparatus according to claim 11, wherein the current block refers to a reference picture list 0, and the at least one neighboring block refers to a reference picture list 1.

16. The apparatus according to claim 11, wherein the processor is further configured to obtain index information from the bitstream,
wherein a motion vector candidate specified by the index information from among the motion vector candidate group is assigned to the motion vector predictor of the current block.

17. The apparatus according to claim 11, wherein the at least one neighboring block includes at least one of a bottom left neighboring block of the current block or a left neighboring block adjacent to the current block.

18. The apparatus according to claim 11, wherein the at least one neighboring block includes at least one of a top right neighboring block of the current block, a top neighboring block of the current block, or a top left neighboring block adjacent to the current block.

19. The apparatus according to claim 11, wherein the processor is further configured to:
   derive a motion vector candidate from a co-located block of the current block, the co-located block being located in a position corresponding to the current block in a picture different from a picture including the current block,
   wherein the motion vector candidate group further comprises the motion vector candidate derived from the co-located block.

20. The apparatus according to claim 11, wherein the POC value represents a number assigned to a picture according to a temporal order of the picture.

* * * * *